(12) United States Patent
Joung et al.

(10) Patent No.: US 7,876,741 B2
(45) Date of Patent: Jan. 25, 2011

(54) METHOD OF ACQUIRING UPLINK SYNCHRONIZATION FOR MOBILE WIMAX SYSTEM ANALYZER

(75) Inventors: Jinsoup Joung, Seongnam (KR); Kyeongmin Ha, Seongnam (KR); Junwan Park, Seoul (KR); Cheoljin Lee, Incheon (KR)

(73) Assignee: Innowireless Co., Ltd., Seongnam (KR)

( * ) Notice: Subject to any disclaimer, the term of this patent is extended or adjusted under 35 U.S.C. 154(b) by 683 days.

(21) Appl. No.: 11/856,938

(22) Filed: Sep. 18, 2007

(65) Prior Publication Data

US 2008/0069080 A1 Mar. 20, 2008

(30) Foreign Application Priority Data

Sep. 18, 2006 (KR) .................... 10-2006-0090208

(51) Int. Cl.
*H04J 3/06* (2006.01)
(52) U.S. Cl. ...................... 370/350; 455/502
(58) Field of Classification Search ................ 370/350; 455/502
See application file for complete search history.

(56) References Cited

U.S. PATENT DOCUMENTS

| | | | | |
|---|---|---|---|---|
| 5,831,974 | A * | 11/1998 | Suonvieri | 370/252 |
| 6,856,802 | B1 * | 2/2005 | Kinnunen et al. | 455/425 |
| 7,336,638 | B2 * | 2/2008 | Cheng et al. | 370/338 |
| 7,778,233 | B2 * | 8/2010 | Joung et al. | 370/350 |
| 2005/0226277 | A1 | 10/2005 | Li et al. | |
| 2007/0202918 | A1 * | 8/2007 | Shin et al. | 455/562.1 |
| 2007/0286127 | A1 * | 12/2007 | Inohiza | 370/331 |
| 2008/0117887 | A1 * | 5/2008 | Joung et al. | 370/338 |
| 2008/0291841 | A1 * | 11/2008 | Joung et al. | 370/252 |

FOREIGN PATENT DOCUMENTS

| KR | 10-2006-0002333 A | 1/2006 |
|---|---|---|
| KR | 10-2006-0019474 A | 3/2006 |
| KR | 10-2006-0025769 A | 3/2006 |
| KR | 10-0656827 B1 | 12/2006 |

* cited by examiner

*Primary Examiner*—Albert T Chou
(74) *Attorney, Agent, or Firm*—Rothwell, Figg, Ernst & Manbeck, P.C.

(57) ABSTRACT

Disclosed herein is a method of acquiring Uplink (UL) synchronization for a mobile WiMax system analyzer. When a DL sub-frame is received, the method is performed on a Portable Subscriber Station (PSS) having a test mode function of creating a UL sub-frame through the mobile WiMax system analyzer having signal generating means configured to store the CID information in advance and signal analyzing means configured to receive and analyze the DL sub-frame. The method includes step (a) of the signal generating means continuously D/A converting, RF-modulating and outputting the DL sub-frame, step (b) of the signal analyzing means receiving the UL sub-frame, step (c) of the signal analyzing means continuously demodulating, A/D-converting and capturing the modulated UL sub-frame, and step (d) of the signal analyzing means acquiring UL synchronization by comparing the UL sub-frame with the data captured at step (c) using a time correlation technique.

9 Claims, 6 Drawing Sheets

[Fig. 1]

PRIOR ART

[Fig. 2]

PRIOR ART

METHOD OF ACQUIRING UPLINK SYNCHRONIZATION FOR MOBILE WIMAX SYSTEM ANALYZER

RELATED APPLICATIONS

The present disclosure relates to subject matter contained in priority Korean Application No. 10-2006-0090208, filed on 18 Sep. 2006 which is herein expressly incorporated by reference in its entirety.

BACKGROUND OF THE INVENTION

1. Field of the Invention

The present invention relates generally to a method of acquiring uplink synchronization for a mobile WiMax system analyzer and, more particularly, to an uplink synchronization acquisition method using the mobile WiMax system analyzer, which enable the mobile WiMax system analyzer to acquire and analyze the uplink synchronization of a Portable Subscriber Station (PSS) using a predetermined test mode, provided to the PSS, without requiring a Radio Access Station (RAS).

2. Description of the Related Art

Currently, methods of wirelessly accessing the Internet include a method of accessing the Internet via a mobile telephone network based on a Wireless Application Protocol (WAP) or Wireless Internet Platform for Interoperability (WIPI), and a method of accessing the Internet via a public wireless Local Area Network (LAN) and an Access Point (AP). However, the method using a mobile telephone network has fundamental limitations on use as a universal Internet access method due to the limited screen size, the limited input interface, and a billing system based on a measured rate system. Meanwhile, the method using a wireless LAN has fundamental problems in that it can only be used within a range having a radius of tens of meters around an AP, and in that it also realizes poor mobility. In order to overcome such problems, mobile WiMax (or WiBro, which is a subset of mobile WiMax and a Korean mobile WiMax standard) system has been proposed as wireless Internet service capable of enabling high-speed Internet access at ADSL-level quality and cost, either when at rest or in intermediate-speed motion.

Figure 1:
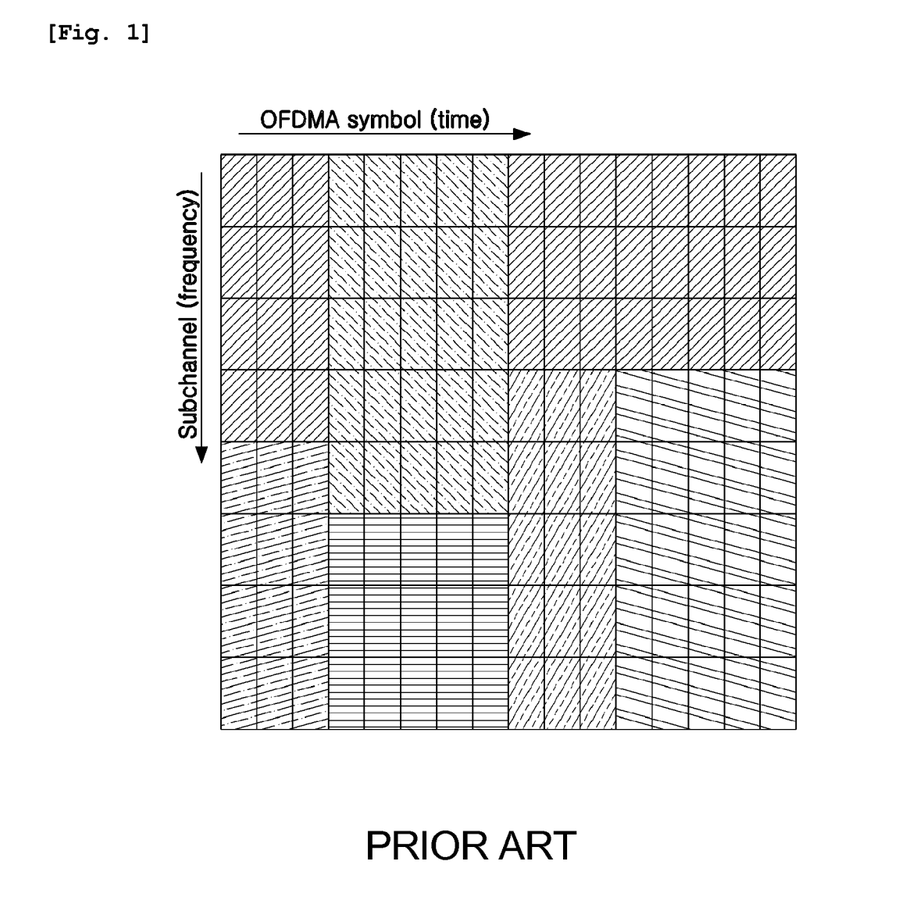
FIG. 1 is a diagram illustrating a method of allocating resources along a time axis and a frequency axis in OFDMA.

FIG. 1 is a diagram illustrating a method of allocating resources along a time axis and a frequency axis in Orthogonal Frequency Division Multiple Access (OFDMA). In general communication systems, since radio resources, that is, time and frequency, are limited, they must be allocated to a plurality of PSS users and used by them. Meanwhile, unlike existing CDMA-based systems and Wireless LAN (WLAN) systems, mobile WiMax system employ OFDMA, in which a two-dimensional resource region, defined by the time axis and the frequency axis, is allocated to respective PSSs, as shown in FIG. 1.

Figure 2:
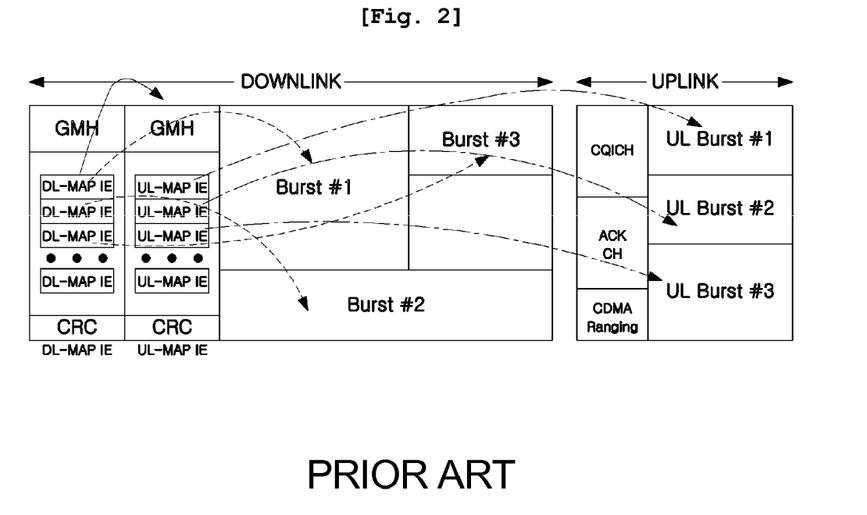
FIG. 2 is a diagram showing the MAP structure of a mobile WiMax system.

FIG. 2 is a diagram showing the MAP structure of a mobile WiMax system. As shown in FIG. 2, in the mobile WiMax system, a plurality of pieces of data using the same channel coding method and modulation method is sent in a batch in order to improve efficiency. A set of data regions using the same channel coding method and modulation method is referred to as a "burst." The location and size information of each burst can be seen from the MAP information of a frame, as shown in FIG. 2. Here, the term 'frame' refers to a structured data sequence having a fixed duration, which is used in the Physical Layer (PHY) standard. A single frame may include both Downlink (hereinafter abbreviated as "DL"; a link from an RAS to a PSS) and Uplink (hereinafter abbreviated as "UL"; a link from a PSS to an RAS) sub-frames.

Since the mobile WiMax system employs TDD, in which UL transmission and DL transmission share the same frequency but are performed at different times, essential information, including the length of a single frame and the ratio of a DL section to a UL section, is provided via MAP information. In order to dynamically allocate resources to PSSs, an RAS may send different MAPs through each frame. In this case, a MAP may be divided into DL_MAP, containing DL transmission information, and UL_MAP, containing UL resource access authority. Here, DL_MAP can be defined as a Media Access Control (MAC) layer message that defines the symbol offset and sub-channel offset of a burst divided and multiplexed along the subchannel and time axes on a downlink by an RAS, and the numbers of symbols and sub-channels, that is, allocated resources. A frame number having a value varying depending on the frame is included in the DL_MAP. Next, the UL_MAP may be defined as a set of pieces of information that completely defines the access to a UL section. UL_MAP may include CID information. Furthermore, a uniquely defined preamble is present in the first symbol of a DL sub-frame, by which the PSS can be made aware of the start point of DL transmission. Furthermore, a cell Identification (ID) information and segment information are included in the preamble.

Meanwhile, in order for the mobile WiMax system analyzer to analyze the performance of a PSS, a signal generation unit for enabling the PSS to maintain DL synchronization is required. If the frame number of a DL signal does not increase, the PSS loses synchronization. The PSS sends a UL signal based on the received DL signal, and the signal analyzer acquires UL synchronization through the step of receiving the signal and estimating the start point of UL transmission and the step of causing frame numbers to coincide with each other. As a result, in order to acquire and analyze UL synchronization by the mobile WiMax system analyzer, a DL sub-frame having a frame number increasing in real time must be created with the help of the RAS, the PSS must be caused to acquire DL synchronization, and then the RAS must perform a network entry procedure in conjunction with the PSS, must be provided with timing synchronization for the start point of UL transmission, and must also be provided with a frame number.

As described above, in order to acquire and analyze UL synchronization for a PSS by a conventional mobile WiMax system analyzer, an RAS must be used. However, this scheme has problems in that it is not easy in practice to use the RAS for a PSS test, and in that the cost of the establishment of an analysis environment for the scheme is high.

SUMMARY OF THE INVENTION

Accordingly, the present invention has been made keeping in mind the above problems occurring in the prior art, and an object of the present invention is to provide a method of acquiring UL synchronization for a mobile WiMax system analyzer having a UL synchronization acquisition function, which enables the mobile WiMax system analyzer to acquire and analyze the UL synchronization of a PSS using a predetermined test mode, provided to the PSS, without requiring the use of an RAS.

In order to accomplish the above object, the present invention provides a method of acquiring UL synchronization for a mobile WiMax system analyzer, the method being performed, when a DL sub-frame containing CID information assigned and stored in advance is received, on a PSS having a test mode function of creating a UL sub-frame through the mobile WiMax system analyzer having signal generating means configured to store the CID information in advance and signal analyzing means configured to receive and analyze the DL sub-frame, without requiring a network entry procedure in conjunction with a RAS, the method including step (a) of the signal generating means continuously D/A converting, RF-modulating and outputting the DL sub-frame obtained by encoding data, including a cell Identification (ID) previously known to the signal analyzing means, the CID information stored in the PSS and at least one frame number; step (b) of the signal analyzing means receiving the UL sub-frame, which is created through encoding of known test data based on the cell ID and the frame number, is RF-modulated and is output by the PSS; step (c) of the signal analyzing means continuously demodulating, A/D-converting and capturing the modulated UL sub-frame to a predetermined extent such that the temporal amount of the UL sub-frame exceeds that of at least one frame; and step (d) of the signal analyzing means acquiring UL synchronization by comparing the UL sub-frame, created by encoding the known test data based on the cell ID and the frame number and stored in advance, with the data captured at step (c), using a time correlation technique.

In the above construction, in the case where the PSS is additionally provided with a test mode function for skipping a check on an increase in frame number, the frame number set forth at step (a) may be a fixed frame number that is known both to the PSS and to the signal analyzing means in advance; and the signal generating means may store the DL sub-frame in a file form, reads the DL sub-frame and then performs step (a).

Furthermore, in the case where the frame number set forth at step (a) is variable, the signal generating means may store a plurality of DL sub-frames, obtained by encoding data, including a cell ID previously known to the signal analyzing means, the CID information stored in the PSS in advance and the sequential frame numbers, in a file, sequentially read the DL sub-frames, and performs step (a), and the signal analyzing means may encode the known test data based on the cell ID and the frame numbers, store the encoded data in a plurality of files, and perform step (d).

Meanwhile, the length of the data captured at step (c) may be equal to or greater than 10 ms, and, at step (d), the signal analyzing means acquires UL synchronization by comparing a first symbol of the UL sub-frame with the data captured at step (c), using a time correlation technique.

Furthermore, in the case where the signal generating means performs step (a) and, simultaneously, sends a trigger signal, indicating a start point of output of the DL sub-frame, to the signal analyzing means, the signal analyzing means may estimate a time point when a predetermined time period has elapsed from a time point of the reception of the trigger signal on the data captured at step (c) as a start point of UL transmission, and perform step (d) from the estimated time point. In contrast, in the case where the PSS is additionally provided with a test mode function for providing a trigger signal, indicating output of the UL sub-frame, to the signal analyzing means at the same time that the UL sub-frame is output, the signal analyzing means may perform step (d) from a time point of the reception of the trigger signal on the data captured at step (c).

BRIEF DESCRIPTION OF THE DRAWINGS

The above and other objects, features and other advantages of the present invention will be more clearly understood from the following detailed description, taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Preferred embodiments of a method of acquiring UL synchronization for a mobile WiMax system analyzer according to the present invention will be described in detail with reference to the accompanying drawings below.

Figure 3:
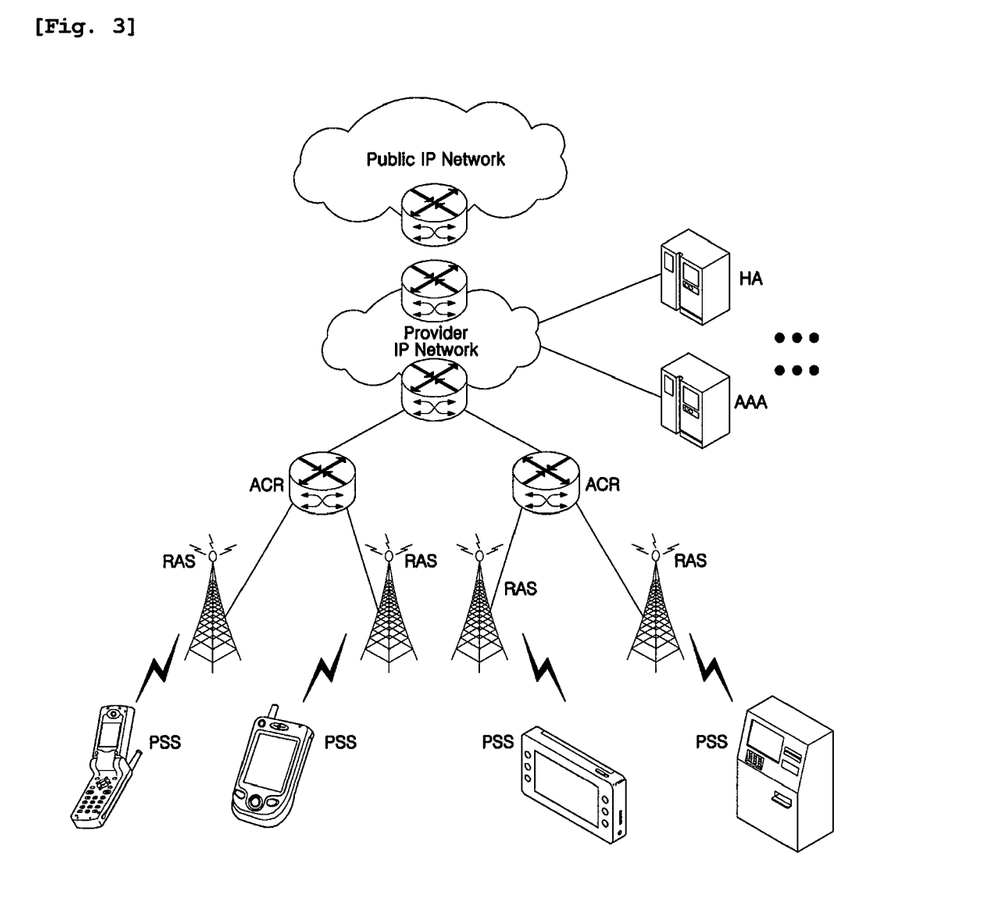
FIG. 3 is a diagram showing the network configuration of a typical mobile WiMax system.

FIG. 3 is a diagram showing the network configuration of a typical mobile WiMax system. As shown in FIG. 3, the basic network configuration of the mobile WiMax system includes Portable Subscriber Stations (PSSs), Radio Access Stations (RASs), and Access Control Routers (ACRs). In the above-described configuration, the PSSs perform the functions of mobile WiMax access, IP-based service access, IP mobility, PSS/user authentication and security, the reception of multicast service, and interworking with other networks. Meanwhile, the RASs perform the functions of mobile WiMax access, wireless resource management and control, support for mobility handoff, authentication and security, the provision of QoS, downlink multicast, billing, the creation of statistical information, and the provision of notification. Finally, the ACRs perform the functions of IP routing, mobility management, authentication and security, QoS provision, IP multicasting, the provision of billing service provision to a billing server, mobility control between the RASs under each of the ACRs, and resource management and control.

The following Table 1 shows principal parameters and essential requirements in the mobile WiMax system. As shown in Table 1, it can be seen that the mobile WiMax system, which is the object of analysis of the present invention, employs Time Division Duplexing (TDD) as a duplex operation method and OFDMA as a multiple access method.

TABLE 1

| Item | Method or value |
|---|---|
| duplex operation method | TDD |
| multiple access method | OFDMA |
| system bandwidth | 10 MHz |
| Transmission rate per subscriber | uplink minimum/maximum 128 Kbps/1 Mbps downlink minimum/maximum 512 Kbps/3 Mbps |
| frequency reuse coefficient | 1 |
| frequency efficiency | maximum frequency efficiency: |

TABLE 1-continued

| Item | Method or value |
| --- | --- |
| | downlink/uplink (6/2) |
| | average frequency efficiency: |
| | downlink/uplink (2/1) |
| handoff | inter-cell handoff within RAS, inter-RAS handoff, |
| | inter-frequency handoff: 150 ms |
| mobility | maximum of 60 km/h |
| service coverage | pico-cell: 100 m |
| | micro-cell: 400 m |
| | macro-cell: 1 km |

The following Table 2 shows the basic parameters of OFDMA for a Partial Usage of Sub-Channel (PUSC) diversity sub-channel, which is designated as an essential implementation option in the mobile WiMax system.

TABLE 2

| Parameter | Parameter value |
| --- | --- |
| system bandwidth | 10 MHz |
| sampling frequency ($F_s$) | 10 MHz |
| sampling interval ($1/F_s$) | 100 ns |
| FFT size ($N_{FFT}$) | 1024 |
| number of subcarriers used | 840 |
| number of data subcarriers | 720 |
| number of pilot subcarriers | 120 |
| subcarrier frequency interval | 9.765625 MHz |
| effective symbol time ($T_b = 1/\Delta f$) | 102.4 μs |
| CP time ($T_g = T_b/8$) | 12.8 μs |
| OFDMA symbol time ($T_s = T_b + T_g$) | 115.2 μs |
| TDD frame length | 5 ms |

As shown in Table 2, it can be seen that, in the mobile WiMax system, the length of a single TDD frame is 5 ms and symbol time is 115.2 μs.

Figure 4:
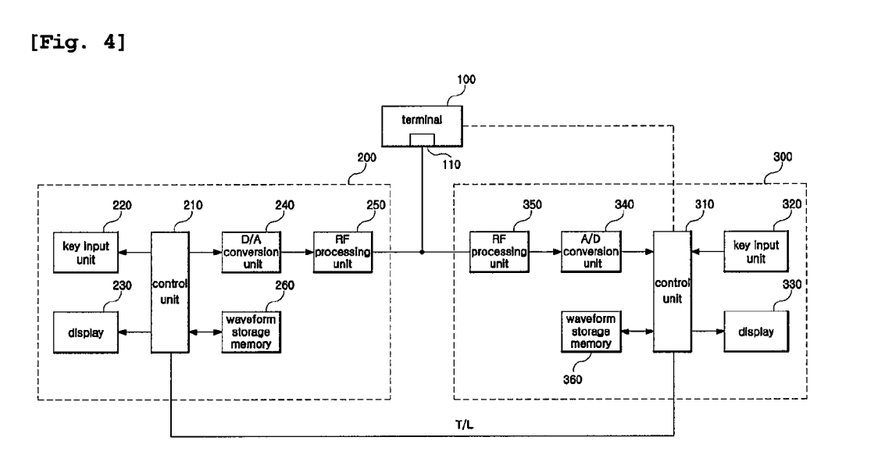
FIG. 4 is a block diagram showing a mobile WiMax system analyzer having a UL synchronization acquisition function according to the present invention.

FIG. 4 is a block diagram of a mobile WiMax system analyzer having a UL synchronization acquisition function according to the present invention. As shown in FIG. 4, the mobile WiMax system analyzer having a UL synchronization acquisition function according to the present invention may include a signal generator 200 for, instead of an RAS, generating a DL sub-frame bound for a PSS 100 and sending the DL sub-frame to the PSS 100, and a signal analyzer 300 for receiving a UL sub-frame directed from the PSS 100 to an RAS, acquiring UL synchronization, and performing analysis. The signal generator 200 and the signal analyzer 300 are all connected to the RF input/output terminal 110 of the PSS 100 via wired cables. In the drawing, T/L is a line for sending a trigger signal, indicating the start point of a DL sub-frame, is used by the control unit (to be described) of the signal generator 200 to send a trigger signal, indicating the start point of a DL sub-frame, to the control unit (to be described later) of the signal analyzer 300, and may be provided as an additional function.

Meanwhile, according to the method of acquiring UL synchronization for a mobile WiMax system analyzer according to the present invention, the PSS 100 must provide a predetermined test mode (PHY mode) function. For example, the PSS 100 provides a function of creating a UL sub-frame, for example, immediately when a CID assigned to it and stored previously is received without requiring an entry process performed in connection with an RAS as an essential function, and may additionally provide a function of skipping error handling even though a frame number does not increase in a DL sub-frame, which is input via the RF input/output terminal 110 thereof (hereinafter referred to as a 'frame number check skipping function') or a function of generating a trigger signal, indicating the start point of a UL sub-frame at the same time that the UL sub-frame is output. Meanwhile, systems including RASs must support a procedure that can be used when a new PSS or a new node is registered with a communication network. After a PSS has been turned on, a network entry procedure is carried out to perform the maintenance of the quality of communication with an RAS, the correction of the start point of a UL section, CID allocation for communication using an RAS, and consultation for a support profile. Here, a Connection Identifier (CID) is an identifier that represents a unidirectional mapping connection between the MAC entities of an RAS and a PSS, and is a 16-bit value that identifies a single UL/DL pair associated with a single connection to equivalent peers in the MAC of an RAS and a PSS.

Referring to FIG. 4 again, the signal generator 200 includes a key input unit 220 for receiving information about the settings and input of various items necessary for the generation of signals for the measurement of the performance of a PSS from a user, a display 230 for visually informing a user of various events occurring during the operation of the device, waveform storage memory 260 for storing at least one DL sub-frame file formed by encoding and A/D-converting DL data, including a previously known cell ID, a test CID and a fixed frame number (in the case where a PSS supports a frame number check skipping function, one DL sub-frame file is enough) or different frame numbers (in the case where a PSS does not support a frame number check skipping function, a total of 16 DL sub-frame files are required), for example, a total of 16 sequential frame numbers, a D/A conversion unit 240 for D/A-converting the DL sub-frame file stored in waveform storage memory 260, an RF processing unit 250 for RF-modulating and outputting the D/A-converted DL sub-frame, and a control unit 210 for controlling the overall operation of the device.

Here, the control unit 210 may be implemented using a typical microcomputer equipped with its own memory. Meanwhile, in the mobile WiMax standard, transmission signals are encoded using different data patterns so as to distinguish respective cells and a frame, that is, transmission signals are encoded using the IDs of respective cells, that is, cell parameters, and the lower four-bit ($2^4$=16) information of a frame number. Accordingly, when the signal analyzer 300 knows the lower four bits of the frame number of the UL sub-frame, sent by the PSS 100, and a cell ID, the signal analyzer 300 can decode the UL sub-frame.

Meanwhile, the signal analyzer 300 includes an RF processing unit 350 for demodulating a modulated UL sub-frame, input from the RF input/output terminal 110 of the PSS 100, an A/D conversion unit 340, for A/D-converting the UL sub-frame signal demodulated by the A/D RF processing unit 350, a key input unit 320 for receiving information about the settings and input of various items necessary for the analysis of signals from a user, a display 330 for visually informing a user of various events occurring during the operation of the device and analysis results, waveform storage memory 360 for storing the first symbol data of UL sub-frames, formed by encoding and A/D-converting data identical to known test data, stored in the PSS 100, based on a known cell ID and a fixed frame number (in the case where a PSS supports a frame number check skipping function, the first symbol data of one UL sub-frame is enough) or different frame numbers (if a PSS does not support a frame number check skipping function, respective pieces of first symbol data of 16 UL sub-frames are required), and a control unit 310 for acquiring UL synchronization by receiving the digital data from the A/D conversion unit 340, continuously capturing the digital data in its own memory, and comparing the digital data with the first symbol data of the UL sub-frame stored in the waveform storage memory 360, and performing required analysis. The control unit 310 may also be implemented using a typical microcomputer equipped with its own memory.

Figure 5:
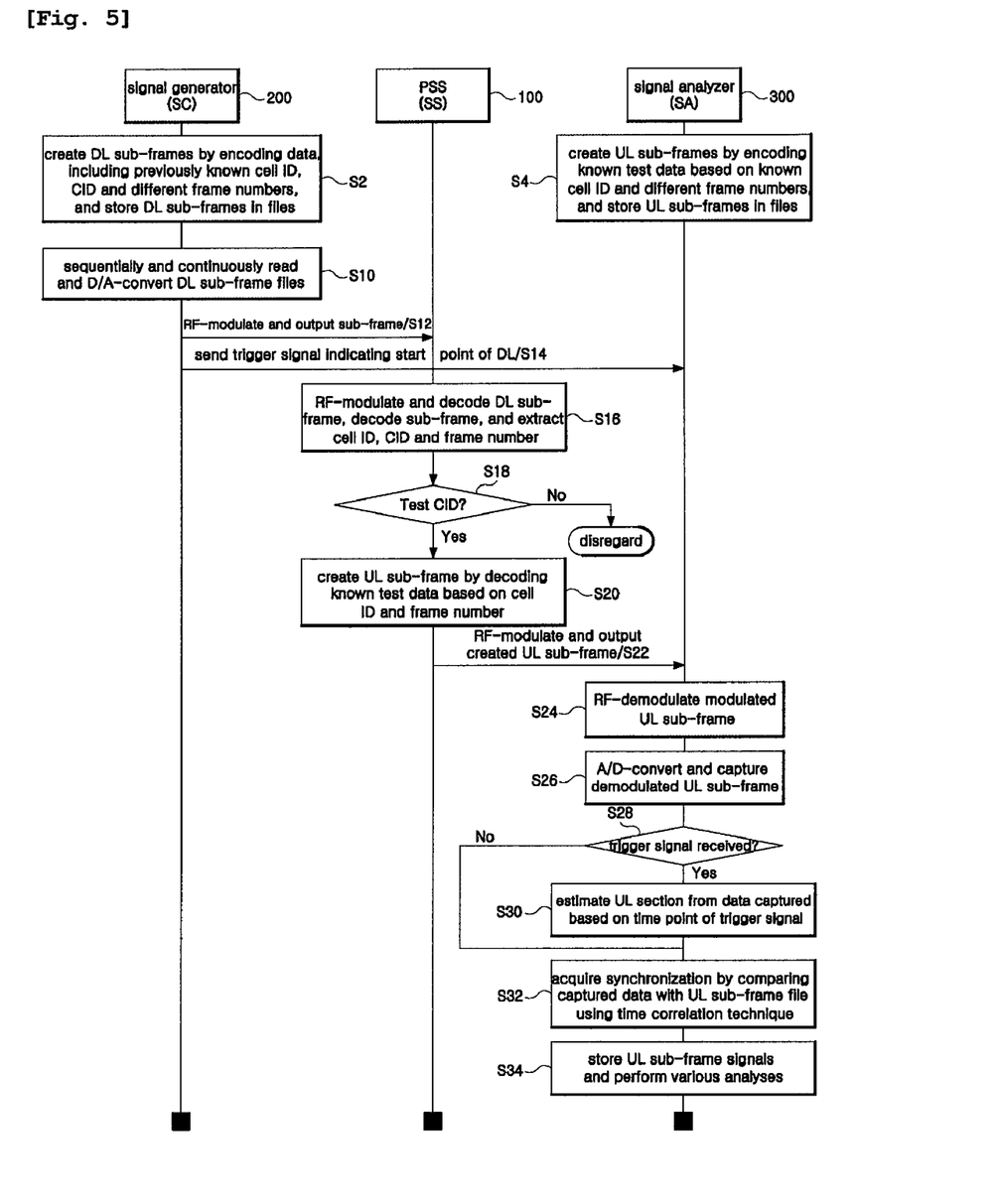
FIG. 5 is a flowchart illustrating a method of acquiring UL synchronization for a portable Internet analyzer according to the present invention.

FIG. 5 is a flowchart illustrating a method of acquiring UL synchronization for a mobile WiMax system analyzer according to the present invention. As shown in FIG. 5, in order to acquire UL synchronization for the PSS 100, first, as described above, a DL sub-frame file, formed by encoding DL data, including a cell ID known both to the PSS 100 and to the signal analyzer 300, CID information, known to the PSS 100, and a fixed frame number (in the case where the PSS supports a frame number check skipping function) or different frame numbers (in the case where the PSS does not support a frame number check skipping function) must be stored in the waveform storage memory 260 of the signal generator 200 in advance at step S2. Furthermore, as described above, the first symbol data of UL sub-frames, formed by encoding known test data, used by the PSS 100, based on a known cell ID and a fixed frame number (in the case where the PSS supports a frame number check skipping function) or different frame numbers (in the case where the PSS does not support a frame number check skipping function) must be stored in the waveform storage memory 360 of the signal analyzer 300 in advance at step S4.

In this state, the signal generator 200, at the start point of a test, continuously reads one or more DL sub-frame files stored in the waveform storage memory 260 (one DL sub-frame file is repeatedly read in the case where the number of DL sub-frame files is one, while a plurality of DL sub-frame files is sequentially read in the case where the number of DL sub-frame files is two or more), and converts the read files into analog signals via the D/A conversion unit 240 at step S10. Thereafter, the signal generator 200 modulates DL sub-frames, converted into the analog signals, via the RF processing unit 250 and outputs the modulated DL sub-frames at step S12. At the same time, the signal generator 200 may send a trigger signal, indicating the start point of DL transmission, to the control unit 310 of the signal analyzer 300 at step S14.

Thereafter, the PSS 100 demodulates the modulated DL sub-frame signals, received from the signal generator 200, into RF signals, A/D-converts them, decodes them, and then extracts the cell ID contained in a preamble and CID information contained in the UL-MAP at step S16. Next, the PSS 100 determines whether the extracted CID information coincides with test CID information assigned to it at step S18. If they do not coincide with each other, this is disregarded. Conversely, if they coincide with each other, known test data is encoded based on the extracted cell ID and frame number (in the case where a function of skipping a check on the continuity of a frame number is provided, the fixed frame number may be known in advance), thereby creating a UL sub-frame at step S20. Thereafter, the PSS 100 D/A-converts, RF-modulates and outputs the created UL sub-frame at step S22.

Meanwhile, the signal analyzer 300 demodulates the modulated UL sub-frame signal, output from the PSS 100, via the RF processing unit 350 thereof at step S24, converts the demodulated UL sub-frame signal into digital data via the A/D conversion unit 340, captures the digital data, and stores the digital data in its own memory at step S26. It is preferred that the amount of data captured as described above be greater than 5 ms, preferably twice as great as 5 ms, in view of the fact that the length of a frame of mobile WiMax signal is 5 ms.

Thereafter, the signal analyzer 300 performs the work of acquiring UL synchronization to extract a UL section from the captured data. In order to reduce the amount of data to be processed and to rapidly acquire synchronization, whether a trigger signal has been received in advance is determined at step S28.

If, as a result of the determination at step S28, a trigger signal has been received from the signal generator 200, the time point of UL synchronization is estimated from the time point of the reception of the trigger signal at step S30 and the work of acquiring UL synchronization is performed from the estimated time point at step S32. Otherwise, the process directly proceeds to step S32, and performs the work of acquiring UL synchronization for the entire captured section.

Figure 6A:
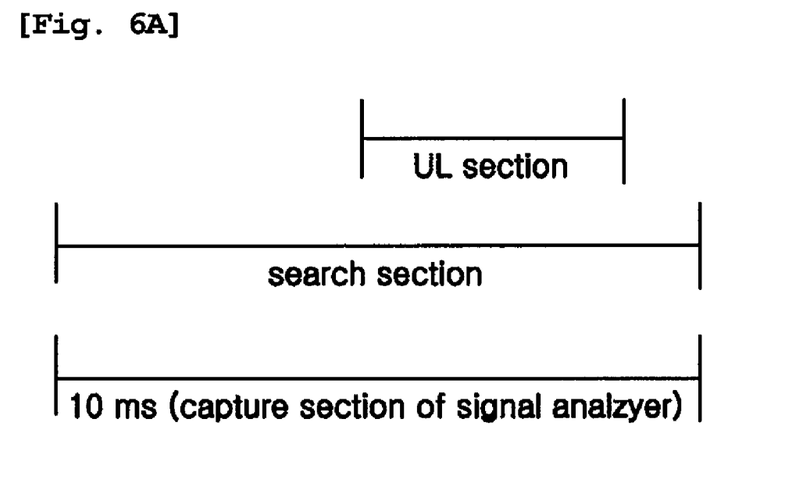
FIGS. 6A and 6B are timing charts each illustrating a search section that is used to acquire the synchronization of the start point of a UL section in a mobile WiMax system analyzer according to the present invention.
Figure 6B:
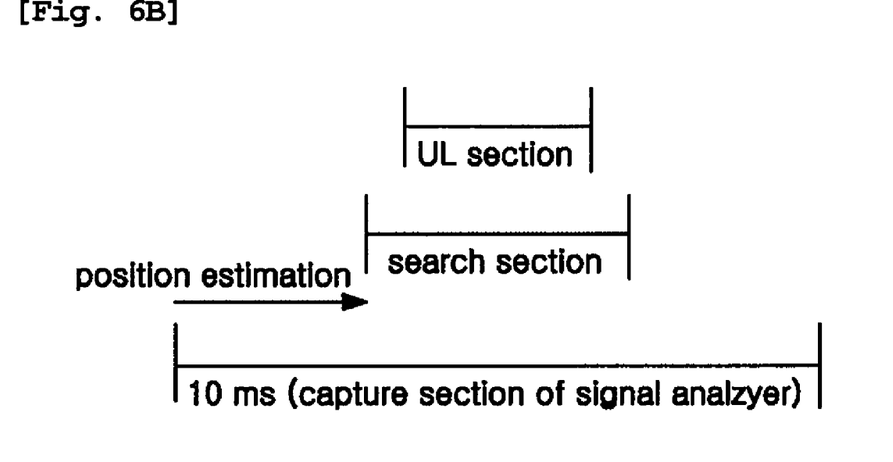

FIGS. 6A and 6B are timing charts each illustrating a search section that is used to acquire the synchronization of the start point of a UL section in a mobile WiMax system analyzer according to the present invention. First, as shown in FIG. 6A, if the trigger signal has not been received from the signal generator 200, the signal analyzer 300 compares the first symbol data (for example 115.2 μs) of the UL sub-frames, stored in the waveform storage memory 360, with the entire section of data captured by the control unit 310 thereof and stored in its own memory, using a time correlation technique, considers the point having the highest correlation to be the start point of UL transmission, and extracts the data of the UL section, the length of which is fixed in the standard (of course, a Receive/Transmit Transition Gap (RTG) exists between the UL section and the DL section, so that the end point of the UL section can be detected using this). Furthermore, when the PSS 100 does not support a frame number check skipping function, UL synchronization is acquired by comparing each of the first symbols of 16 UL sub-frames, stored in the waveform storage memory 360, with the captured UL sub-frame data using a time correlation technique.

In contrast, if a trigger signal has been received from the signal generator 200, the signal analyzer 300 performs the work of acquiring UL synchronization from the time when a predetermined time period, defined in the mobile WiMax standard, for example, 3.1 ms, has elapsed from the start point of the DL sub-frame of UL data that is captured by the control unit 310 thereof and stored in its own memory, so that the amount of data to be processed and the time required for the work of acquiring UL synchronization can be considerably reduced. Thereafter, the signal analyzer 300 can detect the performance of the physical layer of the PSS 100 by analyzing, for example, Error Vector Magnitude (EVM), frequency offset, the transmission power of a PSS, spectrum flatness, a spectral mask, and/or spurious emission, for the extracted UL section.

The method of acquiring UL synchronization for a mobile WiMax system analyzer according to the present invention is not limited to the above-described embodiments, but may be variously modified and worked within the scope of the technical spirit of the present invention. For example, unlike those of the embodiment of FIG. 4, a signal generator and a signal analyzer may be configured in a single block. Furthermore, unlike that of the above embodiment, the PSS 100 may simultaneously create a UL sub-frame and provide a trigger signal, indicating the creation of the UL sub-frame, to the signal analyzer 300, in which case the signal analyzer 300 performs the work of acquiring UL synchronization at the same time that the trigger signal is received.

According to the method of acquiring UL synchronization acquisition for a mobile WiMax system analyzer according to the present invention, the mobile WiMax system analyzer can acquire and analyze the UL synchronization of a PSS using a predetermined test mode, provided to the PSS, without requiring an RAS, so that PSS performance tests can be easily performed at a low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of acquiring Uplink (UL) synchronization for a mobile WiMax system analyzer, the method being performed, when a DL sub-frame containing Connection Identifier (CID) information assigned and stored in advance is received, on a Portable Subscriber Station (PSS) having a test mode function of creating a UL sub-frame through the mobile WiMax system analyzer having signal generating means configured to store the CID information in advance and signal analyzing means configured to receive and analyze the DL sub-frame, without requiring a network entry procedure in conjunction with a Radio Access Station (RAS), the method comprising:

step (a) of the signal generating means continuously D/A converting, RF-modulating and outputting the DL sub-frame obtained by encoding data, including a cell Identification (ID) previously known to the signal analyzing means, the CID information stored in the PSS and at least one frame number;

step (b) of the signal analyzing means receiving the UL sub-frame, which is created through encoding of known test data based on the cell ID and the frame number, is RF-modulated and is output by the PSS;

step (c) of the signal analyzing means continuously demodulating, A/D-converting and capturing the modulated UL sub-frame to a predetermined extent such that a temporal amount of the UL sub-frame exceeds that of at least one frame; and step (d) of the signal analyzing means acquiring UL synchronization by comparing the UL sub-frame, created by encoding the known test data based on the cell ID and the frame number and stored in advance, with the data captured at step (c), using a time correlation technique.

2. The method as set forth in claim 1, wherein:

the PSS is additionally provided with a test mode function for skipping a check on an increase in frame number;

the frame number set forth at step (a) is a fixed frame number that is known both to the PSS and to the signal analyzing means in advance; and the signal generating means stores the DL sub-frame in a file form, reads the DL sub-frame and then performs step (a).

3. The method as set forth in claim 2, wherein a length of the data captured at step (c) is equal to or greater than 10 ms.

4. The method as set forth in claim 1, wherein:

the frame number set forth at step (a) is variable;

the signal generating means stores a plurality of DL sub-frames, obtained by encoding data, including a cell ID previously known to the signal analyzing means, the CID information stored in the PSS in advance and the sequential frame numbers, in a file form, sequentially read the DL sub-frames, and performs step (a); and the signal analyzing means encodes the known test data based on the cell ID and the frame numbers, stores the encoded data in a plurality of files, and performs step (d).

5. The method as set forth in claim 4, wherein a length of the data captured at step (c) is equal to or greater than 10 ms.

6. The method as set forth in claim 1, wherein a length of the data captured at step (c) is equal to or greater than 10 ms.

7. The method as set forth in claim 6, wherein, at step (d), the signal analyzing means acquires UL synchronization by comparing a first symbol of the UL sub-frame with the data captured at step (c), using a time correlation technique.

8. The method as set forth in claim 7, wherein:

the signal generating means performs step (a) and, simultaneously, sends a trigger signal, indicating a start point of output of the DL sub-frame, to the signal analyzing means; and the signal analyzing means estimates a time point when a predetermined time period has elapsed from a time point of reception of the trigger signal on the data captured at step (c) as a start point of UL transmission, and performs step (d) from the estimated time point.

9. The method as set forth in claim 7, wherein:

the PSS is additionally provided with a test mode function for providing a trigger signal, indicating output of the UL sub-frame, to the signal analyzing means at the same time that the UL sub-frame is output; and the signal analyzing means performs step (d) from a time point of reception of the trigger signal on the data captured at step (c).

* * * * *